United States Patent
Watanabe et al.

(10) Patent No.: US 9,074,031 B2
(45) Date of Patent: Jul. 7, 2015

(54) METHOD FOR PRODUCING POLYVINYL ALCOHOL RESIN

(75) Inventors: Satoshi Watanabe, Itoigawa (JP); Takahiro Kozuka, Itoigawa (JP)

(73) Assignee: DENKI KAGAKU KOGYO KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 13/581,560

(22) PCT Filed: Nov. 12, 2010

(86) PCT No.: PCT/JP2010/070173
§ 371 (c)(1),
(2), (4) Date: Aug. 28, 2012

(87) PCT Pub. No.: WO2011/108152
PCT Pub. Date: Sep. 9, 2011

(65) Prior Publication Data
US 2012/0329949 A1 Dec. 27, 2012

(30) Foreign Application Priority Data
Mar. 3, 2010 (JP) ................................ 2010-047162

(51) Int. Cl.
C08F 8/00 (2006.01)
C08F 16/06 (2006.01)
C08F 216/06 (2006.01)
C08F 6/00 (2006.01)
C08F 6/06 (2006.01)
C08F 6/16 (2006.01)
C08F 6/28 (2006.01)
C08J 11/02 (2006.01)

(52) U.S. Cl.
CPC ............ *C08F 216/06* (2013.01); *C08F 6/003* (2013.01); *C08F 6/008* (2013.01); *C08F 6/06* (2013.01); *C08F 6/16* (2013.01); *C08F 6/28* (2013.01); *C08J 11/02* (2013.01)

(58) Field of Classification Search
CPC ............ C08F 6/003; C08F 6/008; C08F 6/06; C08F 8/12; C08F 118/08; C08F 216/06; C08L 29/04
USPC ...................................................... 525/61, 62
See application file for complete search history.

(56) References Cited

U.S. PATENT DOCUMENTS

| | | | | |
|---|---|---|---|---|
| 3,278,505 A | * | 10/1966 | Kominami | ...................... 525/62 |
| 5,319,070 A | | 6/1994 | Hayes | |
| 5,425,879 A | | 6/1995 | Hayes | |

FOREIGN PATENT DOCUMENTS

| | | |
|---|---|---|
| JP | 8-511053 A | 11/1996 |
| JP | 9-504571 A | 5/1997 |
| JP | 2001-81128 A | 3/2001 |
| JP | 2002-060495 A | 2/2002 |
| JP | 2002-301715 A | 10/2002 |
| JP | 2007-245432 A | 9/2007 |

OTHER PUBLICATIONS

International Search Report PCT/JP2010/070173 mailed Jan. 18, 2011.

* cited by examiner

*Primary Examiner* — David W Wu
*Assistant Examiner* — Marie Reddick
(74) *Attorney, Agent, or Firm* — Roberts Mlotkowski Safran & Cole P.C.

(57) ABSTRACT

Provided is a method of producing a polyvinyl alcohol resin, wherein the impurities in the resin are removed efficiently with a small amount of a washing liquid. A polyvinyl alcohol obtained after a polymerization step (step S1) and a saponification step (step S2) is washed with a washing liquid consisting of methyl acetate: 1 to 40 parts by mass, methanol: 50 to 98.9 parts by mass and water: 0.1 to 10 parts by mass in a washing step (step S3). The solid matter concentration of the slurry containing the washing liquid then is 1 to 30 mass %.

3 Claims, 2 Drawing Sheets

US 9,074,031 B2

METHOD FOR PRODUCING POLYVINYL ALCOHOL RESIN

TECHNICAL FIELD

The present invention relates to a method of producing a polyvinyl alcohol resin. More specifically, it relates to a washing technique of removing impurities from product.

BACKGROUND ART

Polyvinyl alcohol (PVA), a water-soluble synthetic resin, has been used mainly as a raw material for synthetic fibers. Recently, it is used in various fields, for example for production of film materials, emulsifying dispersants, adhesives and binder resins, because of its favorable properties. The PVA resins are produced by polymerization of vinyl acetate monomer and saponification of the polyvinyl acetate obtained, but they contains impurities such as sodium acetate generated in the production process. Thus in the traditional method for production of PVA resin, washing is carried out for removal of impurities from the product after saponification step (see, for example, Patent Documents 1 to 3).

For example in the methods of producing a PVA resin described in Patent Documents 1 and 2, powder or pellets of the PVA resin are washed with water or an organic solvent such as methanol for removal of sodium acetate contained therein. Alternatively in the washing method described in Patent Document 3, a slurry containing a solid-state resin is washed on an inclined conveyor for reduction of the amount of the washing liquid such as methanol.

CITATION LIST

Patent Documents

[Patent Document 1] Japanese Unexamined Patent Application Publication No. 2002-301715
[Patent Document 2] Japanese Unexamined Patent Application Publication No. 2002-60495
[Patent Document 3] Japanese Unexamined Patent Application Publication No. 2007-245432

SUMMARY OF INVENTION

Technical Problem

However, the traditional methods described above have the following problems. The production methods described in Patent Documents 1 and 2 have a disadvantage that a great amount of washing liquid is required, because the washing is carried out after conversion of the PVA resin into powder or pellets. Alternatively if a pellet-shaped resin is washed, as in the method described in Patent Document 1, the pellets may contain residual impurities therein. Further if washing is carried out by using water or methanol as in the method described in Patent Document 2, the wet cake of the PVA resin after washing contains its washing liquid, water or methanol, in a great amount and thus, the method is inefficient, as a longer period is needed for the subsequent drying step. Further, the washing method described in Patent Document 3 demands a large-scale device such as screw conveyor, which is unpractical because of the large expense needed for the facility investment.

A major object of the present invention is to provide a method of producing a polyvinyl alcohol resin, wherein the impurities therein can be removed efficiently with a small amount of washing liquid.

Solution to Problem

The method of producing a polyvinyl alcohol resin according to the present invention includes a washing step of washing a polyvinyl alcohol obtained by saponification of a polyvinyl ester with a washing liquid consisting of methyl acetate, methanol and water, wherein the polyvinyl alcohol is washed in a slurry containing methyl acetate, methanol and water at a ratio of methyl acetate: 1 to 40 parts by mass, methanol: 50 to 98.9 parts by mass and water: 0.1 to 10 parts by mass at a solid matter concentration of 1 to 30 mass %.

In the present invention, because the polyvinyl alcohol is washed with a washing liquid containing methanol, water and methyl acetate, compatibility between the polyvinyl alcohol and the washing liquid increases, leading to improvement of washing efficiency. In addition, because the ratio of methyl acetate to the polyvinyl alcohol in the slurry during washing is kept within a particular range, as the blending ratio of methyl acetate, methanol and water constituting the washing liquid and also the solid matter concentration are regulated, the amount of volatile materials remaining in the polyvinyl alcohol resin cake after washing is also reduced.

Washing and filtration can be repeated multiple times in the washing step of the production method. In such a case, the filtrate obtained by filtration may be used for washing in the upstream stage and fresh washing liquid fed into the washing tank in the final stage.

Advantageous Effects of Invention

Because a polyvinyl alcohol generated by saponification is washed with a washing liquid containing methanol, water and additionally methyl acetate at a particular rate, as the solid matter concentration in the slurry containing the washing liquid is kept in a particular range, it is possible according to the present invention to reduce the amount of the washing liquid and remove the impurity sodium acetate efficiently with a small amount of washing liquid.

DESCRIPTION OF EMBODIMENTS

Hereinafter, favorable embodiments of the present invention will be described in detail with reference to attached diagrams. It should be understood that the present invention is not restricted by the embodiments described below.

After intensive studies to solve the problems above, the inventors have found that it is possible, by adding a particular amount of methyl acetate to the washing liquid used in the washing step carried out after saponification step, to reduce the amount of volatile materials contained in the polyvinyl alcohol (PVA) resin cake after washing and improve the downstream drying efficiency. The volatile materials described herein are liquid components derived from the saponification solvent and also from the washing liquid and, for example in the embodiments shown below, the volatile materials correspond to vinyl acetate, methanol and water.

The inventors have also found that the amount of an impurity (sodium acetate) remaining in the PVA resin after washing is dependent on the blending amount of methyl acetate to the washing liquid and the concentration of PVA in the slurry obtained in the saponification step. In the present invention, which was made based on these findings, the PVA obtained in the saponification step is washed with a washing liquid consisting of methyl acetate: 1 to 40 parts by mass, methanol: 50 to 98.9 parts by mass and water: 0.1 to 10 parts by mass. The solid matter concentration in the slurry containing the washing liquid is then 1 to 30 mass %.

First Embodiment

Figure 1:
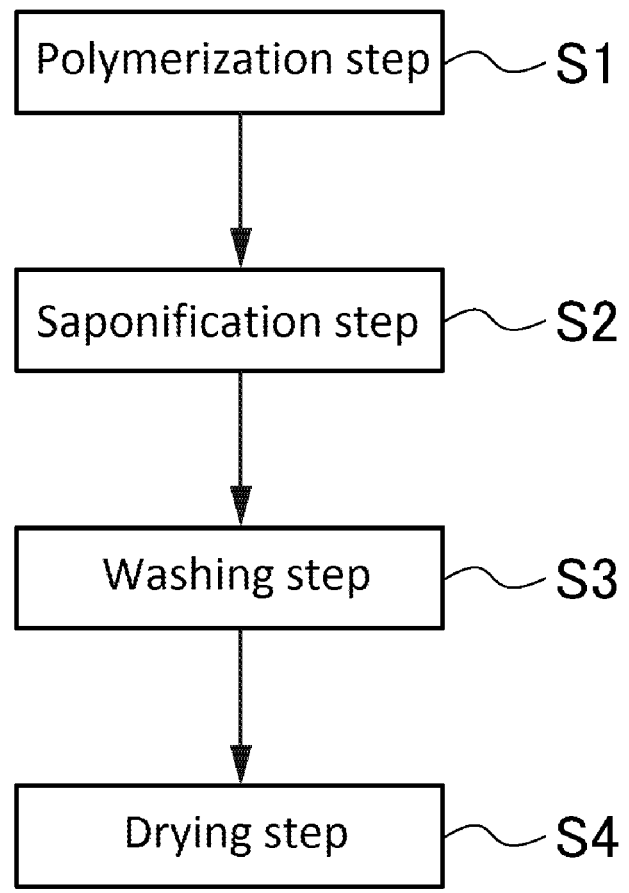
FIG. 1 is a flowchart showing the method of producing a polyvinyl alcohol resin according to the first embodiment of the present invention.

First, the method of producing a PVA resin in a first embodiment of the present invention will be described. FIG. 1 is a flowchart showing the method of producing a PVA resin in this embodiment. As shown in FIG. 1, a polymerization step (step S1), a saponification step (step S2), a washing step (step S3) and a drying step (step S4) are carried out in this order in the method of producing a PVA resin in this embodiment.

[Polymerization Step]

In the polymerization step of step S1, a polyvinyl ester is prepared by polymerization of one or more vinyl esters or by copolymerization of a vinyl ester with other monomers copolymerizable therewith. The vinyl esters for use include, for example, vinyl formate, vinyl acetate, vinyl propionate, vinyl valerate, vinyl caproate, vinyl laurate, vinyl stearate, vinyl benzoate, vinyl pivalate and vinyl versatate, but vinyl acetate is especially preferable from the viewpoint of polymerization stability.

Other monomers copolymerizable with these vinyl esters include, but are not particularly limited to, for example, α-olefins such as ethylene and propylene; alkyl(meth)acrylate esters such as methyl(meth)acrylate, ethyl(meth)acrylate, butyl(meth)acrylate and 2-ethylhexyl(meth)acrylate; unsaturated amides such as (meth)acrylamide and N-methylol acrylamide; unsaturated acids such as (meth)acrylic acid, crotonic acid, maleic acid, itaconic acid and fumaric acid; unsaturated acid alkyl (such as methyl, ethyl and propyl) esters; unsaturated acid anhydrides such as maleic anhydride; unsaturated acid salts (such as sodium salts, potassium salts, ammonium salts, etc.); glycidyl group-containing monomers such as allyl glycidylether and glycidyl(meth)acrylate; sulfonic acid group-containing monomer such as 2-acrylamido-2-methylpropanesulfonic acid and the salts thereof; phosphate group-containing monomers such as acid phosphoxyethyl methacrylate and acid phosphoxypropyl methacrylate; alkyl vinylethers and the like.

[Saponification Step]

In the saponification step of step S2, the polyvinyl ester obtained in step S1 is saponified in an organic solvent in the presence of a catalyst. Alcohols such as methanol, ethanol, propanol, ethylene glycol, propylene glycol, glycerol and diethylene glycol can be used as the organic solvents for use in the saponification step (hereinafter, referred to as saponification solvent), but methanol is particularly preferable.

Examples of the saponification catalysts include alkali catalysts such as sodium hydroxide, potassium hydroxide, sodium alcoholate and sodium carbonate and acid catalysts such as sulfuric acid, phosphoric acid and hydrochloric acid. Among the saponification catalysts above, use of an alkali catalyst is preferable and use of sodium hydroxide is more preferable. It is thus possible to raise saponification rate and improve productivity.

In the saponification step, part or all of the vinyl ester groups in the polyvinyl ester are saponified into vinylalcohol groups. The saponification value of the PVA obtained in the saponification step described above is not particularly limited and can be determined arbitrarily, for example in accordance with its application, but it is generally 65 to 99.99 mol %, preferably 75 to 99.9 mol %.

[Washing Step]

The PVA generated in the saponification step of step S2 is then washed with a washing liquid consisting of methyl acetate, methanol and water (step S3). Specifically, methyl acetate, methanol and water are added to the PVA after the saponification step and the PVA is washed in the slurry containing the washing liquid. The rate of the washing liquid components in the slurry is adjusted then to methyl acetate: 1 to 40 parts by mass, methanol: 50 to 98.9 parts by mass and water: 0.1 to 10 parts by mass.

It is possible to improve the washing efficiency of the PVA by adjusting the composition of the washing liquid used in the washing step, i.e., the blending rate of methyl acetate, methanol and water in the slurry, in the range described above. If the composition of the washing liquid is not in the range above, it leads to decrease in washing efficiency and increase in the amount of volatile materials.

For example if the content of methyl acetate in the washing liquid contained in the slurry is less than 1 part by mass, it inevitably results in increase in the amount of methanol in the slurry, leading to increased load on the solvent recovery step. Alternatively if the content of methyl acetate in the washing liquid is more than 40 parts by mass, it results in decrease in the amount of polar solvents such as water and methanol, which in turn leads for example to deterioration in washing effect, increase in the amounts of the washing liquid used and also residual impurities and elongation of the washing period.

The amount of the methyl acetate in the washing liquid is preferably 5 to 35 parts by mass, more preferably 10 to 30 parts by mass and still more preferably 20 to 35 parts by mass. It is thus possible to improve the washing efficiency and reduce the amount of volatile materials remaining in the PVA cake considerably.

Washing in the washing step is also carried out, as the solid matter concentration of the slurry is adjusted in the range of 1 to 30 mass %. It is thus possible to further improve the PVA washing efficiency. If the solid matter concentration of the slurry is less than 1 mass %, it results in decrease in the amount of PVA in the slurry, which in turn leads to decrease of washing efficiency. Alternatively if it is more than 30 mass %, it results in decrease in the amount of the washing liquid, leading for example to increase in the amount of residual impurities and elongation of the washing period.

When methanol is used as the saponification solvent, the washing liquid component also includes the saponification solvent (methanol) remaining in the PVA before slurry preparation. The PVA before slurry preparation contains occasionally trace amounts of aldehydes, alcohols, acetic acid esters and others, in addition to the saponification solvent including methanol and thus, the slurry prepared in the washing step may contain such components.

Alternatively, a method of feeding and agitating the PVA obtained in the saponification step and the washing liquid in a washing tank, a method of spraying the washing liquid on the PVA obtained in the saponification step, or a method of bringing the PVA obtained in the saponification step and the washing liquid into contact with each other in counter-current flow, for example, can be used as the PVA washing method, but the washing method is not particularly limited thereto. Yet alternatively, a method of spraying the washing liquid on the PVA obtained in the saponification step, as it is filtered in a filtration machine, may also be used.

For example if washing is carried out under agitation in a washing tank for a particular time, the PVA obtained in the saponification step and the washing liquid are fed into the washing tank in such a manner that the solid matter concentration of the slurry, i.e., the amount of the PVA contained in the slurry, falls within the range of 1 to 30 mass %. In addition, the washing period in such a case is desirably 1000 seconds or more. It is thus possible to further reduce the amounts of residual sodium acetate and volatile materials in the PVA cake after washing.

Alternatively when washing is carried out by spraying the washing liquid on the slurry, the amount of the washing liquid to be sprayed on the slurry is preferably adjusted in such a manner that the total amount of the washing liquid to be sprayed is 200 to 10000 parts by mass with respect to 100 parts by mass of PVA.

In the method of producing a PVA resin according to the present embodiment, sodium acetate contained in the PVA is soluble in methanol and water, which are polar solvents. Because the impurity sodium acetate is transferred into the filtrate after washing when the PVA and the washing liquid (including saponification solvent) are separated from each other by a suitable method such as filtration, it is possible to remove the impurity from the PVA.

[Drying Step]

The washing liquid containing methanol, methyl acetate and water remaining in the PVA cake is then removed for drying the PVA (step S4). The method of removing the washing liquid and drying the PVA is not particularly limited and any known method may be applied.

In the method of producing a PVA resin in the present embodiment, other steps, such as cooling step, pulverization step and classification step, may be carried out, as needed, in the drying step of step S4 or after the drying step.

As the PVA after the saponification step is washed in the slurry state in the method of producing a PVA resin in the present embodiment, as described above, it is possible to increase the efficiency of impurity removal and reduce the amount of the washing liquid used, compared to the case where the PVA in the pellet or powder state is washed. In addition, use of a washing liquid containing methyl acetate in addition to methanol and water for washing also leads to improvement in compatibility between the PVA and the washing liquid. It is thus possible to further increase the impurity-removing efficiency. Additionally, it is possible to reduce the amount of volatile materials in the PVA cake after washing and thus to improve the drying efficiency after washing. Furthermore, the washing step in the method of producing a PVA resin according to the present embodiment can use existing facilities, thus demanding no large facility investment.

Second Embodiment

Hereinafter, the method of producing a PVA resin in a second embodiment of the present invention will be described. In the present embodiment, the PVA obtained in the saponification step is washed stepwise in the slurry state, as it is dispersed in a washing liquid containing methyl acetate: 1 to 40 parts by mass, methanol: 50 to 98.9 parts by mass and water: 0.1 to 10 parts by mass at a solid matter concentration of 1 to 30 mass %. The "polymerization step," "saponification step" and "drying step," as used in the method of producing a PVA resin of the present embodiment, are the same as those described above in the first embodiment.

Figure 2:
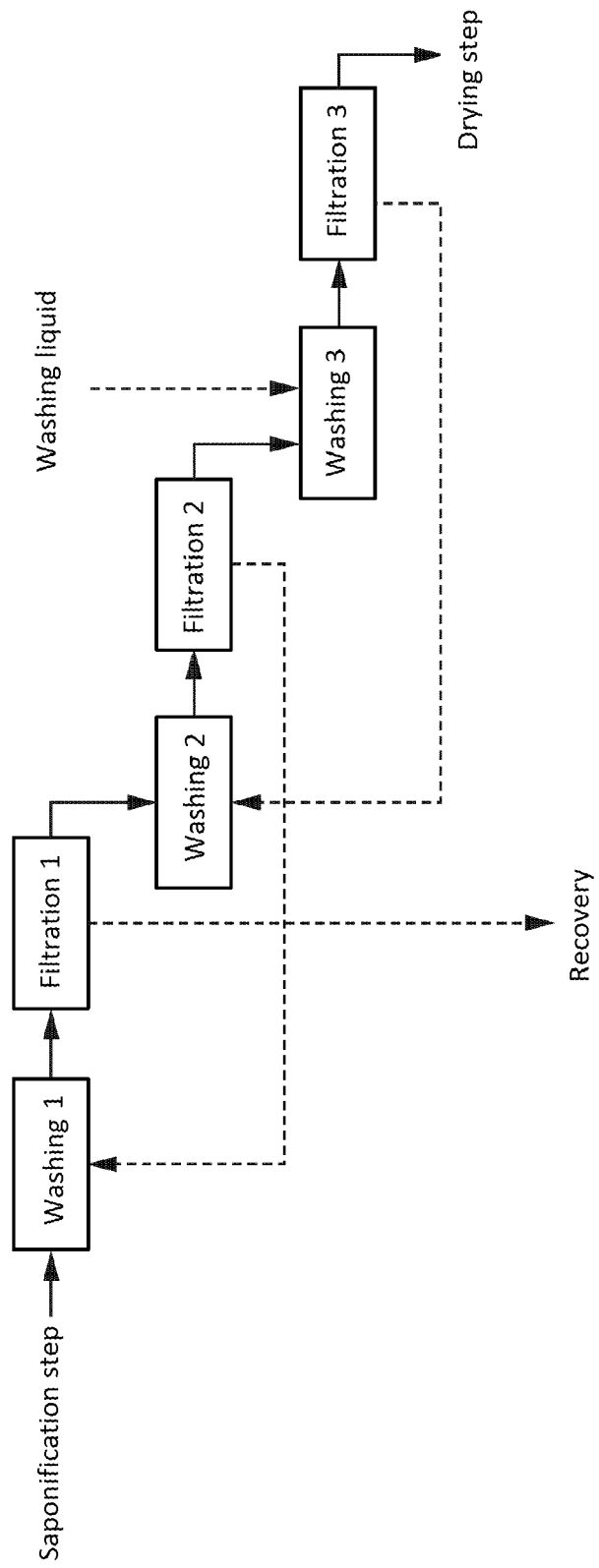
FIG. 2 is a schematic block diagram showing the washing method used in the method of producing a polyvinyl alcohol resin according to the second embodiment of the present invention.

FIG. 2 is a schematic block diagram showing the washing step in the method of producing a PVA resin according to the present embodiment. In the method of producing a PVA resin according to the present embodiment, the number of washing operations is not particularly limited, but washing is desirably carried out thrice or more for more efficient removal of the residual impurities.

For example when washing is carried out thrice, as shown in FIG. 2, the PVA obtained in the saponification step and a washing liquid are fed into a first-stage washing tank and, after washing for a particular period, the washing liquid is separated by filtration. Subsequently, the PVA after filtration and a washing liquid are fed into a second-stage washing tank and, after washing for a particular period, the washing liquid is separated by filtration. Additionally, the PVA after the filtration is washed further in a third-stage washing tank for a particular period and, after filtration, it is subjected to the drying step. It is possible by washing the PVA in multi-stages to reduce the amount of impurities, such as sodium acetate, remaining in the PVA resin considerably.

The washing period in each step is desirably 1000 seconds or more. It is thus possible to reduce the amounts of residual sodium acetate and volatile materials in the PVA cake after washing considerably, compared to conventional methods.

The filtration efficiency then is preferably higher in more downstream stage. Specifically, it is conceivable to use a low-filtration efficiency apparatus such as liquid separation machine for filtration in the first stage, a higher-filtration efficiency apparatus such as press filter in the second stage, and an even higher-filtration efficiency apparatus such as Decon filter in the third stage. It is possible by altering the filtration efficiency in each phase in this way to improve the impurity-removing efficiency and the downstream drying efficiency.

Further in the method of producing a PVA resin according to the present embodiment, it is desirable to feed a fresh washing liquid into the third-stage washing tank, use the third-stage filtrate for washing in the second stage, and use the second-stage filtrate for washing in the first stage. In this case, the washing liquid fed into the third stage may be a washing liquid in the composition of methyl acetate: 0.1 to 40 parts by mass, methanol: 50 to 98.9 parts by mass and water: 0.1 to 10 parts by mass. In such a case, the washing liquids (filtrates) in the first and second stages may contain substances contained in the PVA, such as aldehydes, alcohols and acetic acid esters, in addition to methyl acetate, methanol and water, which are washing liquid components.

In this method, the first-stage filtrate, which contains impurities removed by washing in a greater amount, is collected and purified. The purified washing liquid can be used once again for washing of PVA. It is thus possible to reduce the amount of the washing liquid used in the entire process without deterioration in impurity-removing efficiency by using the first-stage, second-stage and third-stage washing liquids, which become lower in impurity content in this order, each in the upstream steps sequentially.

It is possible, by the method of producing a PVA resin according to the present embodiment, wherein multi-stage washing is carried out, to reduce the amount of the impurities, especially the amount of sodium acetate, remaining in the PVA resin considerably, compared to one-stage washing, when the same amount of washing liquid is used. Further in the method of producing a PVA resin according to the present embodiment, because a washing liquid containing methanol and water as well as methyl acetate is used and the amount of methyl acetate relative to the amount of PVA is adjusted in a particular range, as the amount of methyl acetate in the washing liquid and the solid matter concentration of the slurry are regulated, it is possible to remove impurities from the PVA resin without deterioration in the washing efficiency and the downstream drying efficiency.

Further, it is possible, by feeding fresh washing liquid into the final-stage washing tank and using the filtrate sequentially as the washing liquid in the upstream stage, to reduce the amount of the washing liquid and suppress the increase in production cost needed for construction of a multi-stage facility. Other configurations and advantageous effects of the method of producing a PVA resin according to the present embodiment are the same as those described above in the first embodiment.

EXAMPLES

Hereinafter, advantageous effects of the present invention will be described more specifically with reference to Examples and Comparative Examples. In the Examples below, polyvinyl alcohol resins were produced under different washing conditions and the amounts of volatile materials and residual sodium acetate contained therein were determined. Specifically, first of all, a methanol solution of sodium hydroxide (concentration: 3 mass %) was added to polyvinyl acetate: 37.5 parts by mass, methanol: 62.2 parts by mass and water: 0.2 parts by mass, and the polyvinyl acetate was saponified at 50° C., to give a PVA having an average polymerization degree of 1700 and a saponification value of 99 mol %.

Then, the PVA obtained after saponification and a washing liquid consisting of methyl acetate, methanol and water were fed into a washing tank with a capacity of 100 L, to give a slurry in the composition shown in the following Table 1 or 2, and the PVA was washed by the number of washing stages shown in the following Table 1 or 2. The PVA obtained after removal of the washing liquid by filtration of the slurry was then dried at 120° C. in a Geer oven for 1 hour, to give a PVA cake. The amounts of the volatile materials and the residual sodium acetate in the PVA resin obtained were determined by the method specified in JIS K6276. The results are summarized in the following Tables 1 and 2. In the following Tables 1 and 2, those in which the contents of water and methanol are smaller are indicated by favorable "productivity" (○) and those in which the contents are larger are indicated by unfavorable "productivity" (x).

TABLE 1

| | | | Example 1 | Example 2 | Example 3 | Example 4 | Example 5 | Example 6 | | Example 7 | | |
|---|---|---|---|---|---|---|---|---|---|---|---|---|
| Number of washing stages (stages) | | | 1 | 1 | 1 | 1 | 1 | 1 | 2 | 1 | 2 | 3 |
| Slurry composition | PVA | Content (g) | 100 | 100 | 100 | 100 | 100 | 100 | 100 | 100 | 100 | 100 |
| | | Solid matter concentration (mass %) | 1.00 | 3.06 | 6.00 | 8.01 | 16.03 | 7.00 | 7.00 | 7.00 | 7.00 | 7.00 |
| | Sodium acetate | Content (g) | 2 | 2 | 2 | 2 | 2 | 3.95 | 2 | 3.8 | 2.2 | 0.9 |
| | Methyl acetate | Content (g) | 160 | 160 | 160 | 356 | 163 | 433.4 | 337 | 422.4 | 340.3 | 314 |
| | | Rate in washing liquid (mass %) | 1.62 | 5.05 | 10.22 | 31.06 | 31.23 | 32.72 | 25.41 | 31.89 | 25.66 | 23.65 |
| | Methanol | Content (g) | 9730 | 3000 | 1400 | 675 | 333 | 886.6 | 977.2 | 896.5 | 973.7 | 1001.2 |
| | | Rate in washing liquid (mass %) | 98.28 | 94.64 | 89.46 | 58.90 | 63.79 | 66.93 | 73.67 | 67.68 | 73.41 | 75.41 |
| | Water | Content (g) | 10 | 10 | 5 | 115 | 26 | 4.6 | 12.3 | 5.8 | 12.4 | 12.4 |
| | | Rate in washing liquid (mass %) | 0.10 | 0.32 | 0.32 | 10.03 | 4.98 | 0.35 | 0.93 | 0.44 | 0.93 | 0.93 |
| | | Total (g) | 10002 | 3272 | 1667 | 1248 | 624 | 1428.6 | 1428.5 | 1428.5 | 1428.6 | 1428.5 |
| PVA cake | Volatile materials (g) | | 59.5 | 59.3 | 59.2 | 58.0 | 54.3 | 57.9 | 58.2 | 57.9 | 58.2 | 58.3 |
| | Sodium acetate (g) | | 0.06 | 0.18 | 0.36 | 0.97 | 1.00 | 0.87 | 0.41 | 0.83 | 0.45 | 0.18 |
| Productivity | | | ○ | ○ | ○ | ○ | ○ | ○ | ○ | ○ | ○ | ○ |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Number of washing stages (stages) | | | 1 | 1 | 1 | 1 | 1 | 1 |
| Slurry composition | PVA | Content (g) | 100 | 100 | 100 | 100 | 100 | 100 |
| | | Solid matter concentration (mass %) | 0.50 | 30.58 | 0.25 | 15.50 | 9.43 | 0.50 |
| | Sodium acetate | Content (g) | 2 | 2 | 2 | 2 | 2 | 2 |
| | Methyl acetate | Content (g) | 160 | 83 | 8500 | 258 | 384 | 160 |
| | | Rate in washing liquid (mass %) | 0.80 | 36.89 | 21.35 | 47.51 | 40.04 | 0.80 |
| | Methanol | Content (g) | 19670 | 140 | 31200 | 283 | 455 | 19700 |
| | | Rate in washing liquid (mass %) | 98.89 | 62.22 | 78.35 | 52.12 | 47.45 | 99.09 |
| | Water | Content (g) | 60 | 2 | 121 | 2 | 120 | 20 |
| | | Rate in washing liquid (mass %) | 0.30 | 0.89 | 0.30 | 0.37 | 12.51 | 0.10 |
| | | Total (g) | 19992 | 327 | 39923 | 645 | 1061 | 19982 |
| PVA cake | Volatile materials (g) | | 59.6 | 57.6 | 58.4 | 56.9 | 57.4 | 59.6 |
| | Sodium acetate (g) | | 0.03 | 1.95 | 0.02 | 1.60 | 0.90 | 0.09 |
| Productivity | | | X | ○ | X | ○ | X | X |

In Comparative Examples 1, 3 and 6 shown in Table 2 above, the content of residual sodium acetate reached the desired value, but the amount of methanol used was larger, leading to increased load on the subsequent solvent recovery step. Alternatively in Comparative Example 5, the content of residual sodium acetate reached the desired value, but the amount of water used was larger, leading to fusion of the resulting PVA particles into film shape and also to noticeable deposition thereof on the drier. Yet alternatively in Comparative Examples 2 and 4, the content of residual sodium acetate is larger, indicating insufficient washing.

In contrast, as shown in Table 1 above, in Examples 1 to 7, wherein washing is carried out within the scope of the present invention, it was possible to produce a desired PVA containing only limited amounts of volatile materials and residual sodium acetate by using a smaller amount of the washing liquid. The results above confirm that it is possible to wash the PVA efficiently with a limited amount of the washing liquid according to the method of the present invention.

The invention claimed is:

1. A method of producing a polyvinyl alcohol resin, comprising obtaining a polyvinyl alcohol by saponification of a polyvinyl ester, and then washing the polyvinyl alcohol in a slurry state with a washing liquid to remove sodium acetate therefrom,
   wherein the washing liquid contains methyl acetate, methanol and water, and the amount of the washing liquid components in the slurry is methyl acetate: 1 to 40 parts by mass, methanol: 50 to 98.9 parts by mass and water: 0.1 to 10 parts by mass, and wherein the amount of the polyvinyl alcohol in the slurry is within a range of 1 to 30 mass %, and
   wherein after an initial washing with the washing liquid, the washing liquid is separated from the polyvinyl alcohol by filtration, and the filtrate is used in a subsequent washing of the polyvinyl alcohol in a slurry state, and the washing and the filtration steps are repeated multiple times.

2. The method of producing a polyvinyl alcohol resin according to claim 1,
   wherein a last washing is conducted with a fresh previously unused washing liquid.

3. The method of producing a polyvinyl alcohol resin according to claim 1, wherein the amount of the polyvinyl alcohol in the slurry is within a range of 1 to 16.03 mass %.

* * * * *